United States Patent [19]

Petersen

[11] Patent Number: 5,118,571
[45] Date of Patent: Jun. 2, 1992

[54] STRUCTURE AND METHOD FOR FORMING STRUCTURAL COMPONENTS

[75] Inventor: Donald H. Petersen, Grand Prairie, Tex.

[73] Assignee: LTV Aerospace and Defense Company, Dallas, Tex.

[21] Appl. No.: 631,996

[22] Filed: Dec. 21, 1990

[51] Int. Cl.⁵ .................. B32B 3/20; B23K 101/02; B23K 101/04
[52] U.S. Cl. .................. 428/586; 428/593; 228/157; 228/193
[58] Field of Search ........... 428/593, 586, 598, 603; 52/806, 808; 228/118, 157, 181, 183, 193

[56] References Cited

U.S. PATENT DOCUMENTS

| | | | |
|---|---|---|---|
| 3,123,907 | 3/1964 | Thomas | 228/181 |
| 3,349,464 | 10/1967 | Becker et al. | 228/157 |
| 3,683,487 | 8/1972 | Sherman | 228/118 |
| 3,924,793 | 12/1975 | Summers et al. | 228/157 |
| 3,927,817 | 12/1975 | Hamilton et al. | 228/157 |
| 4,217,397 | 8/1980 | Hayase et al. | 428/594 |
| 4,220,276 | 9/1980 | Weisert et al. | 228/118 |
| 4,223,053 | 9/1980 | Brogan | 428/593 |
| 4,294,419 | 10/1981 | Fouse et al. | 244/117 R |
| 4,509,671 | 4/1985 | Weisert | 228/157 |
| 4,526,312 | 6/1985 | Goss et al. | 228/157 |
| 4,607,783 | 8/1986 | Mansbridge et al. | 428/593 |
| 4,632,296 | 12/1986 | Mansbridge et al. | 228/157 |
| 4,882,823 | 11/1989 | Weisert et al. | 228/157 |

FOREIGN PATENT DOCUMENTS

| | | | |
|---|---|---|---|
| 2647382 | 11/1990 | France | 228/181 |
| 1381183 | 1/1975 | United Kingdom | 228/157 |
| 2109711A | 6/1983 | United Kingdom | 228/157 |

*Primary Examiner*—John Zimmerman
*Attorney, Agent, or Firm*—Stephen S. Sadacca

[57] ABSTRACT

A metal structural component (10) is formed by placing metal tubes (16) between two metal sheets (12) and plastically deforming the tubes (16) by injecting pressured gas therein. The injected gas expands the tubes by superplastic deformation until diffusion bonding occurs between the metal sheets (12) and expanded tubes (16) to form the desired support structure between the metal sheets (12).

27 Claims, 4 Drawing Sheets

STRUCTURE AND METHOD FOR FORMING STRUCTURAL COMPONENTS

FIELD OF THE INVENTION

This invention relates to the structure and method for making metal structural components through superplastic deformation and diffusion bonding.

BACKGROUND OF THE INVENTION

Metallic sandwich structures are used extensively as load bearing components in many products. Generally, such metallic sandwich structures comprise upper and lower outer skins having an interior structure to provide the desired support, strength and stiffness characteristics. A common sandwich structure comprises two flat steel or alloy sheets with I-beam supports therebetween. The I-beams may be attached between the two metal sheets by a number of fastening systems, i.e., riveting, seam welding, spot welding, etc.

There are various applications where special design criteria must be met and sandwich structural components are used. Trusses for bridges and other architectural structures require strength and durability while maintaining a reasonable strength-to-weight ratio. Likewise, frame components for aircraft must also maintain a high strength and stiffness-to-weight ratios while maintaining the ability to distribute axial as well as shear loads.

Superplastic formation of metallic sandwich structures provides a structure capable of meeting specific design criteria in the most demanding applications. Superplasticity is the ability of certain metals to elongate without necking when deformed under specific temperature and strain rate conditions. Superplastic formation was first utilized in the production of complex shapes. Examples of superplastic formation of metallic sandwich structures are disclosed in U.S. Pat. Nos. 4,217,397 to Hayase et al.; 3,924,793 to Summers; and 3,927,817 to Hamilton. These patents disclose the formation of sandwich structures or panels from three or four layers of sheet metal. One or two sheets of metal are expanded between the outer two sheets of metal by pressurized gas. The inner sheet(s) is capable of being formed into various shapes of inner support structures for the panel. To achieve the structural support shapes within the sandwich structures, seam welds, spot welds and maskants are used to locate connecting points between the outer sheets and inner sheet(s). These assembly requirements are costly and time consuming. Further, the designs in the above referenced patents incorporate necessary flow paths between the expandable sections to insure uniform expansion. At times, such flow paths can seal themselves off, thereby preventing the pressurized gas from fully expanding particular pockets.

Therefore, a method for producing metallic sandwich structures by superplastic deformation is needed that is simple and economical while producing consistent and homogenous structures having adequate strength characteristics.

The present inventive method of using tubes combined with sheets provides a number of benefits over conventional superplastic forming/diffusion bonding (SPF/DB) practice. Curved structures are difficult to manufacture by state-of-the-art SPF/DB methods. Problems of tooling tolerance limitations often result in small but catastrophic forming die mismatch leading to poor, or lack of, diffusion bond between the metal sheets. Unless the metal layers are in intimate contact, there will be little chance for formation of a metallurgical bond. Gaps of a few thousandths of an inch usually lead to failure.

There is always a problem of thickness control with commercial sheet metal products, especially titanium. Tolerances may range up to ±5%. When there are variations in the thickness of the metal sheets, the result is the same as if the tooling tolerances are poor which once again can result in poor diffusion bonding. By using the inventive tubes, the problems of tooling tolerance and sheet to sheet thickness variations are essentially eliminated. The tube expands to meet the sheet surface and strongly interfaces with it. It can be likened to an inner tube being inflated within a tire. It completely fills the space. The pressure against the outer walls provides the intimate contact required to achieve a solid diffusion bond.

While conventional multi-sheet superplastic forming/diffusion bonding techniques are easy to demonstrate on flat panels, they are difficult to apply when fabricating the typical curved structures found in aircraft design. The problem is the movement of the sheets relative to each other when forming the curved parts from flat sheets. While each individual sheet could be formed separately and then combined in the final fabrication step, this is very expensive. Not only are the labor and press operation costs multiplied by the number of processing steps needed, there is the added cost of cleaning each of these panels again after forming but prior to the final bonding step to remove any process induced surface contamination that would preclude good diffusion bonding conditions.

Obviously, it is desirable to accomplish both the forming and the diffusion bonding in one pressing. One current approach is to use stop-off coatings to prevent diffusion bonding from occurring where it is not wanted so that the layers of metal can be expanded to form complex structures. Any movement of the sheets which causes misalignment of areas to be bonded causes severe quality problems. Consistent production of reliable structures via this method is difficult.

Another method for production of curved structures is the use of what is known as the "four-sheet" SPF/DB technique. That method uses sheets welded with patterns to regulate the shape and dimension of the expanded structural cells. Unfortunately, the welded center two layers can diffusion bond to each other before the step o of patterned expansion occurs. In addition, the structure formed via this processing method does not result in closed gas pathways as the welded patterns are seldom continuous welds.

Practice of the inventive method of using tubes disclosed herein instead of the welded sheets eliminates the need for welding and will not suffer the problem of closing-off of the gas pressurization pathways. There are structures where active cooling is desired and where the maintenance of separate flow pathways is desired. This inventive method lends itself particularly well to these kinds of structures.

SUMMARY OF THE INVENTION

The present invention provides a method and structure for producing a metallic sandwich structure from sheet metal and metal tube stock. In one aspect, two metal sheets are captured in a die. Metal tubes of a similar metal or alloy are placed between the two metal sheets. One end of each tube is sealed, and the other end of each tube is provided with a source of pressurized gas. The pressure of the gas expands the tubes to form a support structure between the two metal sheets. Due to the heat and pressure, diffusion bonding occurs between the mating surfaces of the tubes as well as between the expanded tubes and the two metal sheets. This diffusion bonding provides an almost continuous bond throughout the sandwich metal structure providing structural strength and integrity to the structural component.

In another aspect, a first portion of a die is lined with a metal sheet, maskant is applied to a second portion of the die, one or more metal tubes are placed between the second portion of the die and the metal sheet and then the metal tubes are diffusion bonded to the metal sheet by injecting inert pressurized gas into the tubes until they are superplastically deformed and the diffusion bonding occurs.

BRIEF DESCRIPTION OF THE DRAWINGS

A better and more complete understanding of the present invention and advantages thereof will be gained from the following Detailed Description, claims and accompanying drawings, in which:

FIG. 2 is a plan view of the present invention shown in FIG. 1a;

DETAILED DESCRIPTION

Figure 1A:
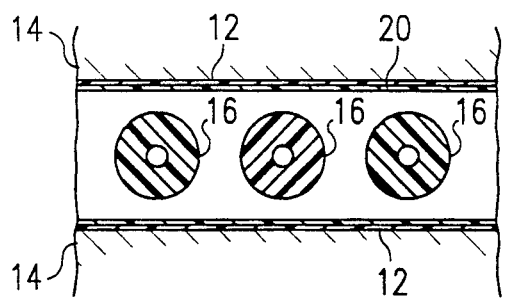
FIG. 1a is a sectional view of the present invention prior to superplastic deformation of the tubes.

The present invention provides a metallic sandwich structure 10 (shown in the completed form in FIG. 1b) and the method of forming such structural components. FIG. 1a illustrates the structural component 10 of FIG. 1b prior to superplastic deformation and diffusion bonding. Component 10 is made up of two sheets 12 of metal or metal alloy captured in a die 14. A number of tubes 16 are positioned by conventional means and methods between metal sheets 12 along parallel longitudinal axes 15 (FIG. 2) which are equidistantly spaced from each other. The number of tubes 16 used in a particular application is dependent on the type of final structure desired. The number of tubes used can vary from one to as many tubes as needed for a particular design. Tubes 16 should be made of the same or similar metal or metal alloy as the sheets 12 to promote diffusion bonding. Sheets 12 and tubes 16 are placed in die 14 which is heated by conventional means to the desired temperature. As shown only in the embodiment of FIGS. 1a and 1b, a thin sheet of chemically pure titanium (CP titanium) 20, which is 99% pure or better, may be placed between sheets 12 and tube 16.

Figure 3:
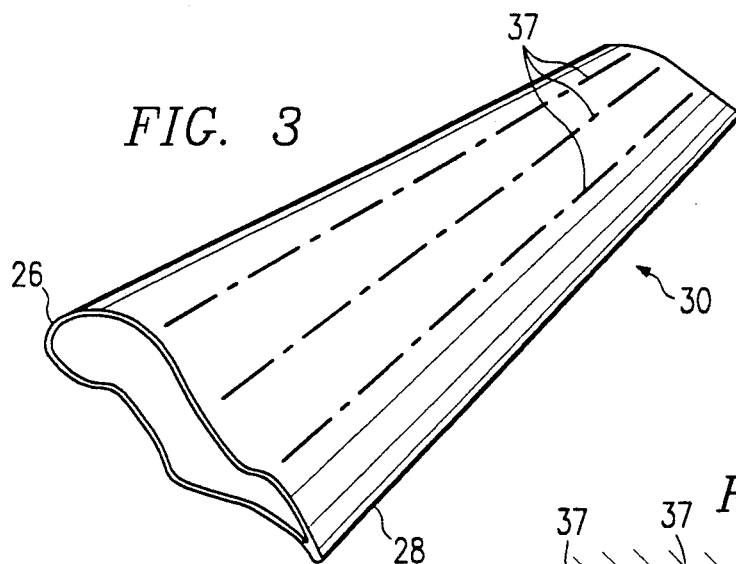
FIG. 3 is a plan view of the present invention in the shape of a wing.
Figure 5A:
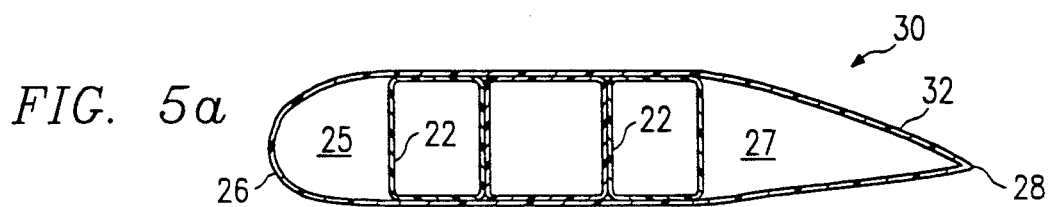
FIGS. 5a and 5b are sectional views of a structural component assembled as an airfoil.
Figure 5B:
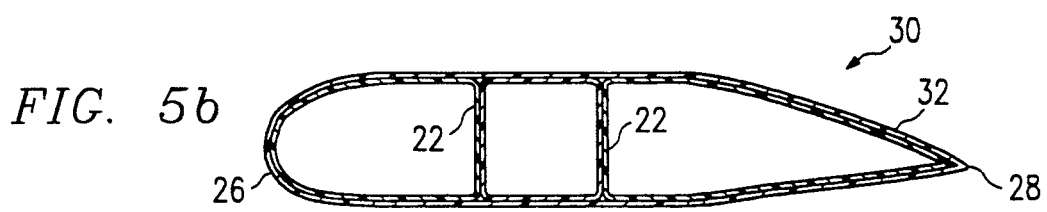

The thin sheet 20 of CP titanium provides two benefits to the structure. First, when using titanium 6-4, there is a tendency for the vanadium and aluminum to flow into the sheet of CP titanium facilitating the forming of a bond across the interface. Second, the CP titanium is ductile thereby building up the toughness of the bond between sheets 12 and tube 16. If during service a crack initiates in sheet 12 or expanded tube 16, propagation of the crack will tend to stop at the interface of CP titanium. A structural component like that shown as component 10 in FIG. 1b can be used to form a wing structure 30 as shown in FIGS. 3 and 5a and 5b by incorporating the component into a skin defining the leading edge 26 and trailing edge 28. With reference to FIG. 5a, removable mandrels (not shown) of the correct size and shape, must be inserted into spaces 25 and 27 during the forming of the wing structure 30 in order to form and maintain the structure as shown. With reference to FIG. 5b, the tubes may be allowed to expand into the leading edge and trailing edge cavities and provide the support structures for sheet 32 without using removable mandrels.

Figure 1B:
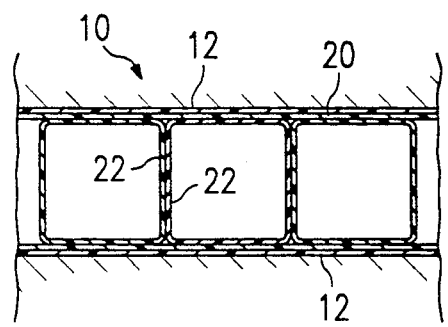
FIG. 1b is a sectional view of the present invention after superplastic deformation of the tubes.
Figure 2:
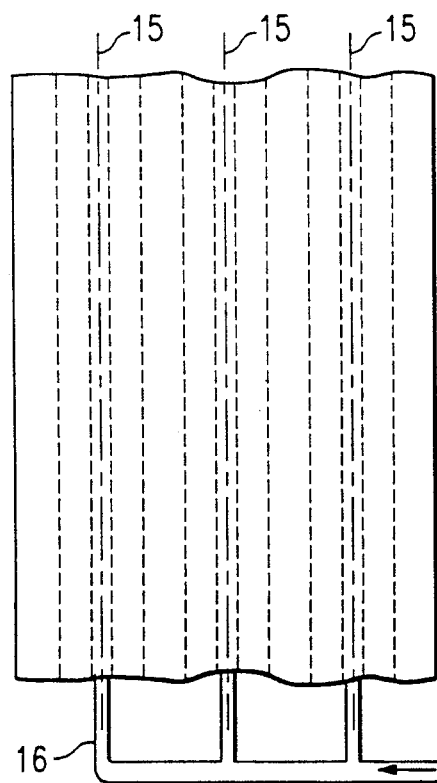

In the practice of the present invention, one end of each of tubes 16 is sealed. Referring now to FIG. 2, a pressurized gas source 18 directs pressurized gas into the open end of tubes 16 to expand the tubes until structural component 10 is formed as depicted in FIG. 1b. Spacing the tubes 16 along axis 15 and equidistant from each other promotes uniform spacial superplastic deformation and a uniform support structure. Further, the wall thickness of the tubes 16 may be varied to achieve non-uniform superplastic deformation allowing various support structure configurations. In the preferred embodiment, an inert gas is utilized to expand the tubes so that reaction between the gas and the tube material is avoided. The gas should be pressurized sufficiently to achieve superplastic deformation of tubes 16 and diffusion bonding between tubes 16 and sheets 12.

The temperature and pressure ranges will vary according to materials used. Some metals capable of superplastic deformation are selected alloys of aluminum, steel, titanium, copper, and magnesium. Some ceramics also exhibit superplastic characteristics. Processing temperature and pressure ranges for each material used are easily derivable. For example, where titanium is used, processing in the temperature range of 1500° to 1900° F. under a pressure of 50–500 psi has been found to provide for successful deformation and diffusion bonding.

In the first embodiment depicted in FIGS. 1a and 1b, the tubes are superplastically deformed to achieve a substantially orthogonal relationship between sheets 12 and final formed support structural legs 22. The tubes 16 are placed in-between the metal sheets 12 along axis 15 and nominally equidistant from each other such that during superplastic deformation the tube 16 expand into each other forming square support structures.

Figure 1C:
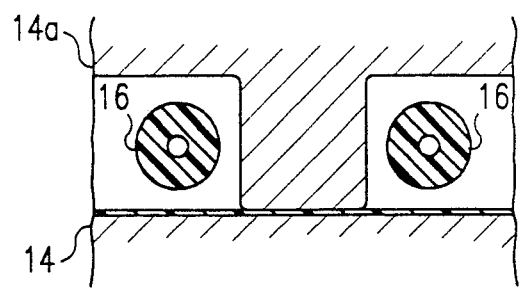
FIG. 1c is a sectional view of the present invention prior to superplastic deformation of the tubes in a spacer die.
Figure 1D:
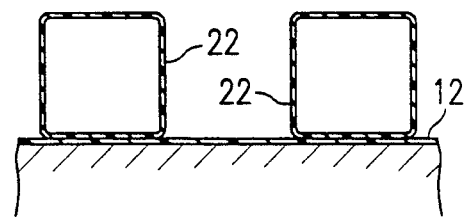
FIG. 1d is a sectional view of the invention in FIG. 1c after superplastic deformation of the tubes, a space being maintained between the expanded tubes.
Figure 1E:
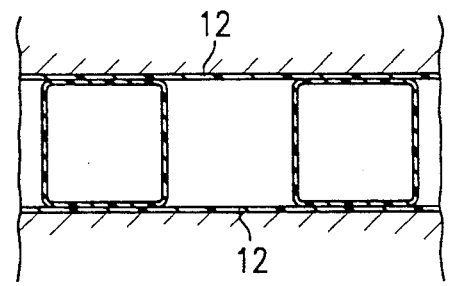
FIG. 1e is a sectional view of the invention in FIG. 1d with a top plate diffusion bonded to the expanded tubes.

FIGS. 1c, 1d, and 1e depict a second embodiment wherein a space is maintained between the support structure legs 22 after superplastic deformation of adjacent tubes 16. This is accomplished by utilizing a spacer die 14a when superplastically deforming tubes 16. A maskant, for preventing diffusion bonding between the expanded tubes 16 and the die 14a is utilized, such as graphite, boron nitride or yttria. The die 14a is removed and a sheet 12 is diffusion bonded to the top of expanded tubes 16 as is shown in FIG. 1e. It will be appreciated that expanded tubes 16 will be pressurized during the bonding of sheet 12 to the top of the expanded tubes to prevent collapse of the structural support legs 22.

In the case of making frame components for aircraft, sheets 12 as well as tubes 16 are made of titanium 6-4 alloy (an alloy having 6% aluminum and 4% vanadium by atomic weight). Die 14 is shaped in a rectangle for producing a rectangular structural component or wing box as shown in FIG. 1b. Pressurized gas is injected into tubes 16 to expand them to form structural component 10 having orthogonal support structural legs 22. An inert gas is used in this embodiment, such as argon, to avoid reaction with or other adverse effects on the titanium alloy. Other gases, such as nitrogen and oxygen, can react with or enter the titanium alloy interstitially and are therefore undesirable for use in this particular embodiment.

Figure 4:
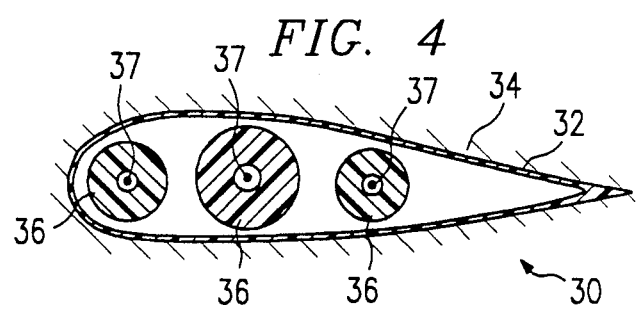
FIG. 4 is a sectional view of the present invention in an airfoil die prior to superplastic deformation.

Referring now to FIG. 4, an airfoil shaped structural component 30 is shown. To form this shape, a die 34, shaped as an airfoil, is used and a single sheet 32 is provided to form the outer wall of component 30. Sheet 32 may be formed from two halves, e.g., clamshell shaped, and welded together to form the airfoil shape. Tubes 36 are placed at predetermined positions, by conventional means and methods, within the boundary defined by sheet 32 and expanded as set out above to form internal support structure for the wing. The predetermined positions may be along axes which are not equidistant or parallel (see axes 37 of FIG. 3).

Figure 6:
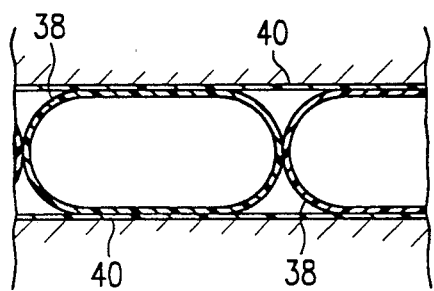
FIG. 6 is a sectional view of the present invention after superplastic deformation wherein the support structure is oval.
Figure 7:
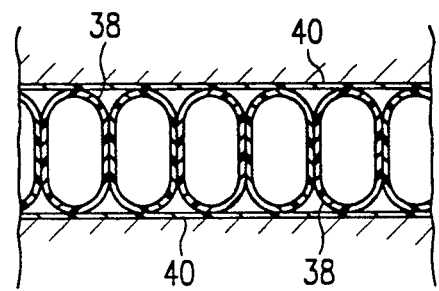
FIG. 7 is a sectional view of the present invention after superplastic deformation wherein the support structure is oval.

FIGS. 6 and 7 represent further embodiments of the present invention. Tubes 38 can be placed between sheets 40 at spacings such that ovals are formed rather than rectangles. Elliptical contours may be formed from tubes 38 by placing tubes 38 closer or farther apart, depending on the orientation of the elliptical shapes desired, and expanding tubes 38 as set out above and ceasing such expansion of the tubes when the desired shape is achieved. By placing tubes 38 closely together before expansion, an oval support structure as shown in FIG. 7 may be achieved. By spacing tubes 38 farther apart, an oval support structure as shown in FIG. 6 may be achieved. The oval shape of the expandable tube 38 provides better load distribution than rectangles as shown in FIG. 1b. The formation of the particular expanded tube shapes of FIGS. 6 and 7 is also a function of the processing time together with the temperature and pressure conditions. Further, less material is used in the formation of the structure shown in FIGS. 6 and 7 gaining a weight advantage. However, the structures of FIGS. 6 and 7 do not lend themselves to complete and reliable mathematical analysis. Therefore, in certain situations, such as airframe construction, the structures as set out in FIG. 1 are preferred in the industry.

Figure 8:
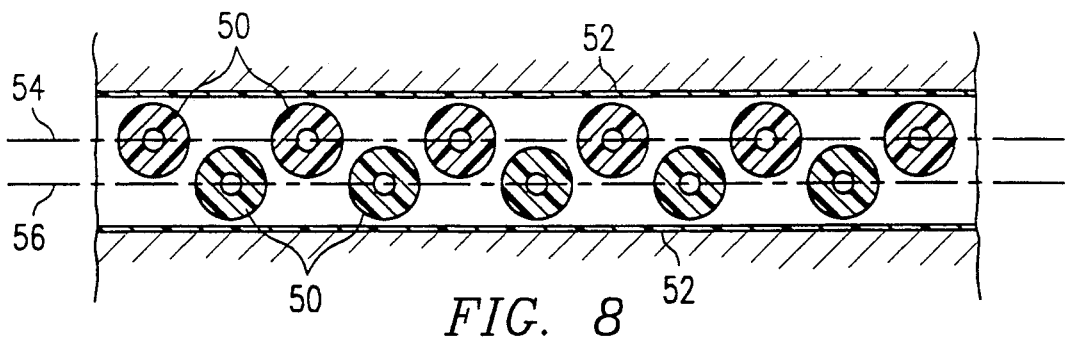
FIG. 8 is a sectional view of the present invention prior to superplastic deformation.
Figure 9:
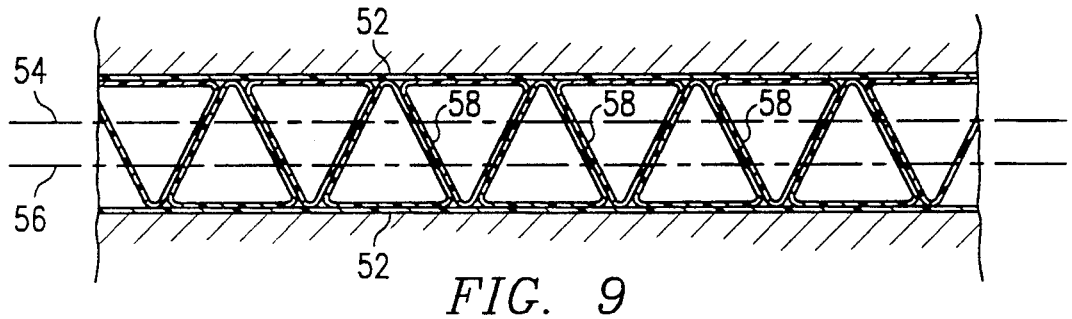
FIG. 9 is a sectional view of the present invention wherein the support structure is triangular.

FIGS. 8 and 9 represent still another embodiment of the same invention in the form of a truss. Tubes 50 are placed by conventional means and methods between the metal sheets 52, alternately on axes 54 and 56. Tubes 50 are superplastically deformed as set out above to form a triangular support structure as shown in FIG. 9. The geometric relationships and the tube wall thickness are related and would be selected based on the final configuration that is desired. Although not readily apparent from the drawings, due to the expansion characteristics of tubes 50, variations in wall thickness and some necking will occur in the support structure. Once the tubes 50 are expanded and contact other expanding tubes or metal sheets 52, metal flow at the points of contact will decrease significantly. Tubes 50 will tend to expand at points where there is no contact, resulting in slightly elliptical cross section of the support structure legs 58 of the truss.

Figure 10:
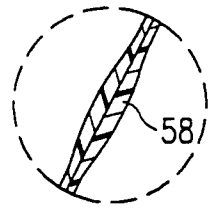
FIG. 10 is an enlarged sectional view of one of the support legs of the structure in FIG. 9.

FIG. 10 is a detail of a formed support structural leg 58 of tubes 50. It will be noticed that the wall thickness of the point of first contact between the adjacent tubes will be thicker than the wall thickness removed therefrom.

Figure 11A:
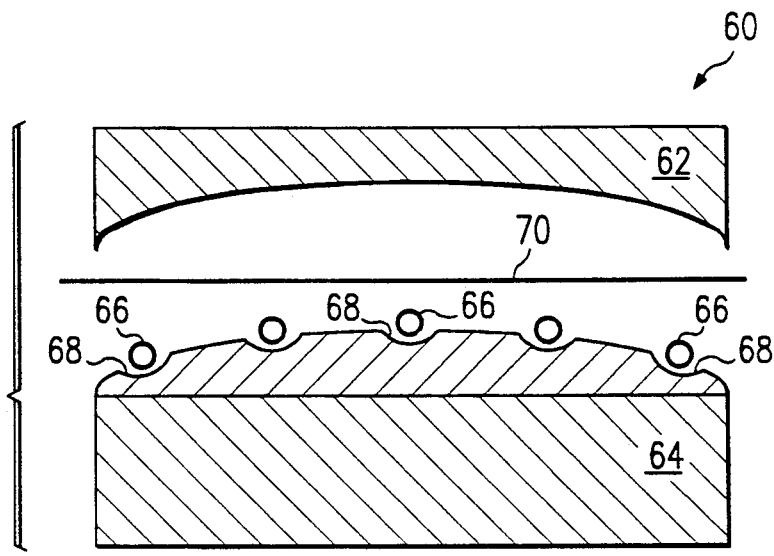
FIGS. 11a-11c pictorially illustrate the steps of the method in forming an additional embodiment of the present invention.
Figure 11B:
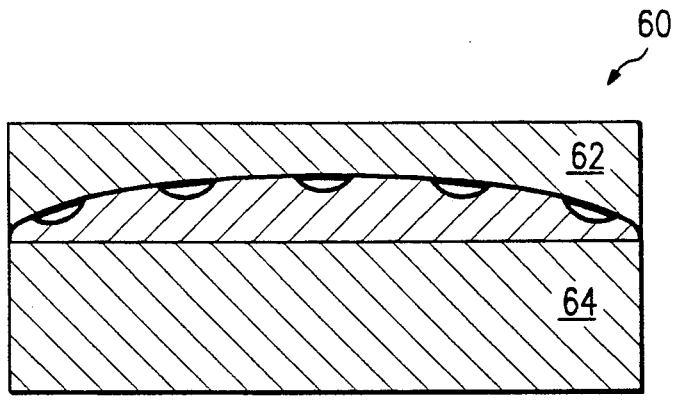
Figure 11C:

FIGS. 1a-1c illustrates the steps of the method in forming an additional embodiment with the present invention. Die or forming tool 60 comprises a first portion 62 and a second portion 64. Tubes 66 are positioned in depressions 68 formed in second portion 64 while a metal sheet 70 is positioned between the first portion 62 and the second portion 64. The die or forming tool is closed (see FIG. 11b) and tubes 66 are superplastically deformed as set out above to form a curved support structure 72 (see FIG. 11c). It is desirable to keep the surfaces of the tubes 66 and metal sheet 70 clean. This can be accomplished by conventional means and methods, e.g., bellows on the outside of the die or forming tool 60, remove air within bellows, etc. As in the above embodiments, the die or forming tool is heated and pressurized, inert gas is used.

Figure 12A:
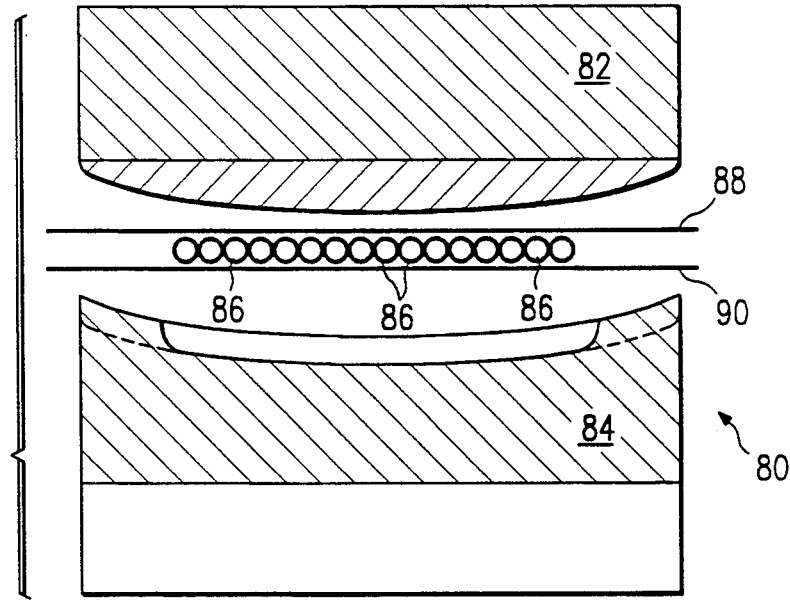
FIGS. 12a-12b pictorially illustrate the steps of the method in forming an additional embodiment of the present invention.
Figure 12B:
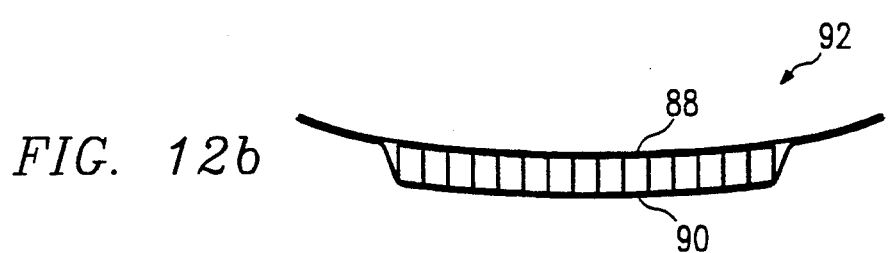

FIGS. 12a and 12b illustrate the steps of the method in forming an additional embodiment of the present invention. Die or forming tool 80 comprises a first portion 82 and a second portion 84. Tubes 86 are positioned between metal sheets 88 and 90 which are then positioned between first portion 82 and second portion 84. The die or forming tool 80 is closed and the tubes 86 are superplastically deformed as set out above to form a curved support structure 92. Again, it is desirable to keep the surfaces clean.

Various support structural shapes may be formed by the above method. Highly contoured finished shapes may require complex and unique support structures. The method of forming support structures set out above provides a means to accomplish these results.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention. Thus, the present application is intended to cover such rearrangements, modifications and substitutions as fall within the scope of the invention.

I claim:

1. A method of forming a metal structure comprising the steps of:
   supporting a pair of metal sheets with a separation therebetween;
   placing at least one metal tube between them metal sheets; and
   superplastically expanding and deforming the at least one metal tube by injecting pressurized gas into the at least one metal tube until contact is made with the metal sheets and diffusion bonding occurs to form a support structure between the metal sheets.

2. A method in accordance with claim 1 wherein said step of placing comprises:
   placing a plurality of metal tubes between the metal sheets with the axes of the metal tubes oriented at predetermined angles with respect to adjacent metal tubes;
   and wherein said step of superplastically expanding and deforming comprises:
   superplastically expanding and deforming the plurality of metal tubes by injecting pressurized gas into the plurality of metal tubes until contact is made with the metal sheets and diffusion bonding occurs to form a support structure between the metal sheets.

3. A method in accordance with claim 1 wherein said step of placing comprises:
   placing a plurality of metal tubes between the metal sheets with the axes of the metal tubes substantially mutually parallel;
   and wherein said step of superplastically expanding and deforming comprises:
   superplastically expanding and deforming the plurality of metal tubes by injecting pressurized gas into the plurality of metal tubes until contact is made with the metal sheets and diffusion bonding occurs to form a support structure between the metal sheets.

4. A method in accordance with claim 1 wherein said step of placing comprises:
   placing a plurality of metal tubes between the metal sheets with the axes of the metal tubes parallel and equidistant from each other;
   and wherein said step of superplastically expanding and deforming comprises:
   superplastically expanding and deforming the plurality of metal tubes by injecting pressurized gas into the plurality of metal tubes until contact is made with the metal sheets and diffusion bonding occurs between adjacent ones of the plurality of metal tubes and between the plurality of metal tubes and the metal sheets, the expanded plurality of metal tubes forming a substantially orthogonal support structure between the metal sheets.

5. A method in accordance with claim 1 wherein said step of placing comprises:
   placing a plurality of metal tubes between the metal sheets with the axes of the metal tubes parallel and generally equidistant from each other;
   and wherein said step of superplastically expanding and deforming comprises:
   superplastically expanding and deforming the plurality of metal tubes by injecting pressurized gas into the at least one metal tube until contact is made with the metal sheets and diffusion boding occurs between adjacent ones of the plurality of metal tubes and between the plurality of metal tubes and the metal sheets to form a support structure between the metal sheets, the expanded plurality of metal tubes forming curvilinear support walls between the metal sheets.

6. A method in accordance with claim 1 wherein said step of placing comprises:
   placing at least two metal tubes between said metal sheets, said at least two metal tubes being at different distances from the metal sheets as they are placed along the span of the metal sheets,
   and wherein said step of superplastically expanding and deforming comprises:
   superplastically expanding and deforming the at least two metal tubes by injecting pressurized gas into the at least two metal tubes until contact is made with the metal sheets and diffusion bonding occurs between adjacent ones of the at least two metal tubes and between the at least two metal tubes and the metal sheets to form a support structure between the metal sheets, the expanded at least two metal tubes forming support walls between the metal sheets which are angularly positioned from the support walls.

7. A method in accordance with claim 1 further comprising the step of placing a thin sheet of chemically pure material between the metal sheets and the at least one metal tube prior to the step of superplastically expanding and deforming the at least one metal tube to facilitate diffusion bonding between the metal sheets and the at least one metal tube.

8. A method in accordance with claim 1 wherein the step of superplastically expanding and deforming the at least one metal tube comprises:
   sealing off one end of the at least one metal tube to be deformed; and
   superplastically expanding and deforming the at least one metal tube by injecting pressurized gas in the other end of the at least one metal tube to be deformed until contact is made with the metal sheets and diffusion bonding occurs to form a support structure between the metal sheets.

9. The structure formed from the method of claim 1.

10. A method of forming a metal structure in a die comprising the steps of:
    lining opposed surfaces of the die with metal sheets;
    placing at least one metal tube between the metal sheets, and
    superplastically deforming the at least one metal tube by injecting non-reactive pressurized gas into the at least one metal tube until contact is made with the metal sheets and diffusion bonding occurs to form a support structure between the metal sheets.

11. A method in accordance with claim 10 wherein the step of superplastically deforming the at least one metal tube comprises:
    sealing off one end of the at least one metal tube to be deformed; and
    superplastically deforming the at least one metal tube by injecting non-reactive pressurized gas in the other end of the at least one metal tube to be deformed until contact is made with the metal sheets and diffusion bonding occurs to form a support structure between the metal sheets.

12. The product made from the method of claim 10.

13. A method of forming a metal structure in a two-part die having a first die portion and a second die portion, comprising the steps of:
    lining the first die portion with a first metal sheet;
    applying maskant to the second die portion;

placing a plurality of metal tubes between the first and second die portions;

superplastically expanding and deforming the metal tubes by injecting inert pressurized gas into the metal tubes until contact is made with the first metal sheet and the second die portion and diffusion bonding occurs between the first metal sheet and the thus expanded metal tubes;

removing the second die portion to expose the side of the thus expanded metal tubes which is remote from the first metal sheet; and bonding a second metal sheet to the thus exposed remote side of the expanded metal tubes.

14. The product made from the method of claim 13.

15. A method for forming a metal structure in a die comprising the steps of:

lining the surfaces of the die with metal sheets;

placing at least one metal tube, having one sealed end and uniform wall thickness, between the metal sheets; and superplastically deforming the at least one metal tube by injecting nonreactive pressurized gas into the at least one metal tube to expand the at least one metal tube uniformly until contact is made with the metal sheets and diffusion bonding occurs, thereby forming a support structure between the metal sheets.

16. A method in accordance with claim 15 wherein the step of placing comprises:

placing a plurality of metal tubes, each having one sealed end and uniform wall thickness, between the metal sheets with the axes of the metal tubes being parallel to each other;

and wherein the step of superplastically deforming comprises:

superplastically deforming the plurality of metal tubes by injecting nonreactive pressurized gas into the plurality of metal tubes to expand the plurality of metal tubes uniformly until contact is made with the metal sheets and diffusion bonding occurs, thereby forming a support structure between the metal sheets.

17. A method in accordance with claim 16 wherein the tubes are placed equidistant from each other between the metal sheets.

18. A metal structure comprising:

an upper metal sheet and lower metal sheet;

at least one expanded and superplastically deformed metal tube between the upper and lower metal sheets and diffusion bonded to the upper and lower metal sheets to form a support structure.

19. The metal structure of claim 18 wherein the upper and lower metal sheets and the at least one metal tube are of a titanium alloy.

20. The metal structure of claim 18 wherein said at least one metal tube is rectangular.

21. The metal structure of claim 18 wherein the support structure comprises walls that are substantially orthogonal to the upper and lower metal sheets.

22. The metal structure of claim 18 wherein the support structure comprises curvilinear walls.

23. The metal structure of claim 18 wherein the support structure comprises walls that are angularly positioned relative to said upper and lower metal sheets.

24. The metal structure of claim 18 wherein the metal structure is formed as an airfoil.

25. The metal structure of claim 18 further comprising a thin sheet of chemically pure material interposed between the at least one metal tube and one of the upper and lower metal sheets.

26. A metal structure comprising:

at least one metal sheet;

a plurality of superplastically expanded and deformed metal tubes positioned at predetermined locations along the at least one metal sheet and diffusion bonded to the at least one metal sheet to form a support structure.

27. The metal structure of claim 26 wherein the at least one metal sheet and the plurality of metal tubes are of a titanium alloy.

* * * * *